Nov. 23, 1965      E. A. DOW      3,218,749
FISH ACTUATED WEEDLESS BAIT
Filed May 8, 1964

INVENTOR
EDMUND A. DOW
by Charles R. Fay
ATTORNEY

_United States Patent Office_

3,218,749
Patented Nov. 23, 1965

3,218,749
FISH ACTUATED WEEDLESS BAIT
Edmund A. Dow, Worcester, Mass., assignor of one-half to Edmund J. Dow, Northboro, Mass.
Filed May 8, 1964, Ser. No. 365,953
4 Claims. (Cl. 43—35)

This invention relates to a new and improved fishing bait or lure, and the principal object of the invention is to provide a lure which is weedless, i.e., will not catch upon or engage weeds at the points or in the bends of the hooks thereof, but which at the same time when struck by a fish will immediately cause the points of the hooks to become dislodged from a new and improved keeper therefor so as to engage and hook the fish.

Another object of the invention resides in the provision of a lure which is adapted to be cast or trolled and which includes a relatively soft cylindrical sleeve of rubber or plastic or similar material which acts as a keeper for the hooks which are held therein by spring pressure in such a way that the points of the hooks are completely concealed by the cylinder and including means within the cylinder which when moved as by a fish grasping the flexible sleeve or cylinder dislodges a set or trigger mechanism causing the hooks to move relatively rearwardly with respect to said cylindrical sleeve; this motion therefore releases the hooks from the sleeve and allows them to project outwardly directly into the mouth or the area of the lips of the fish which has struck at the bait.

Other objects and advantages of the invention will appear hereinafter.

Reference is to be had to the accompanying drawings, in which.

Figure 1:
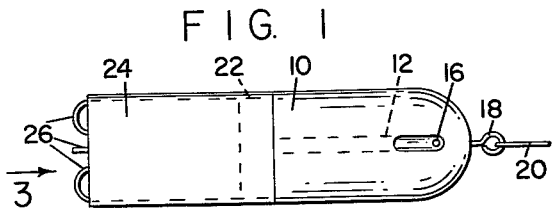
FIG. 1 is a view in elevation illustrating a form of the device with the hooks set in weedless condition.

Referring now to FIG. 1 there is shown a lure which has what may be a generally solid head 10. This solid head has an axial bore through it as indicated at 12 for a purpose to be described. It also has a through transverse slot 14 which accommodates a pin 16 to be described, but it will be seen that the pin 16 can move right and left in FIG. 1 in the slot 14. The head 10 can be of any configuration desired. It can be of any color, solid or weighted, or it can be hollow for buoyancy.

At one end the head is provided with an eye 18 for attachment to a line 20 as will be clear to those skilled in the art and at its rear end it is reduced as at 22 to receive a hollow cylindrical sleeve 24 which is fastened thereto surrounding the reduced part 22. The sleeve 24 is made of yieldable plastic, rubber or similar material and it can be of different sizes or shapes as well as colors. It can be decorated as fishscale, frog, etc., and it can have other appurtenances such as fins, skirts, etc., attached to it for the attraction of fish as is well known to those skilled in the art.

Figure 2:
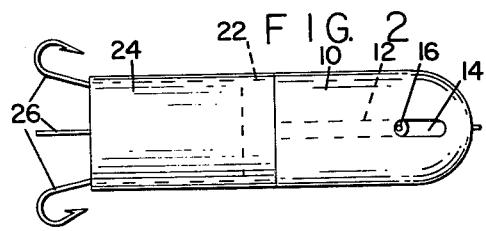
FIG. 2 is a partial view similar to FIG. 1 showing the hooks in fish-hooking condition.

Looking at FIG. 1 the reference numeral 26 indicates the bends or hooks which are located in the sleeve 24, the points of which point outwardly and are within the sleeve and are held concealed therein and thereby. In FIG. 2 the hooks are shown as having moved to the left from the position of FIG. 1, rearwardly, so that the points thereof have been released, and spring means to be described has caused the hooks to expand outwardly in a radial direction in order to hook the fish. This happens when the flexible sleeve 24 is distorted by a fish grasping it in making a strike.

Figure 3:
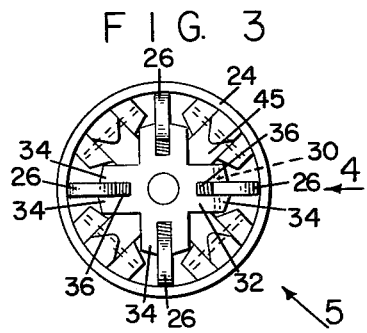
FIG. 3 is an end view on an enlarged scale looking in the direction of arrow 3 in FIG. 1.

FIG. 3 shows the FIG. 1 set condition of the hooks and also indicates that thre are four hooks involved. However, a single hook can be used, or two hooks or any number desired.

The hooks 26 are provided with eyes which receive small pins 30 extending through the same and pivoting them with relation to a body member 32. Body member 32 is best shown in FIG. 3 and in the form of the invention shown is provided with four sets of radially extending spaced arms 34 between which the various hooks are pivotally mounted on the pins 30, the latter extending through arms 34. Between each pair of arms 34 there is a spring 36 normally tending to push its respective hook outwardly to the FIG. 4 position so that when the body member 32 is moved to the rear from the housed position of the hooks to the exposed position thereof, the hooks spring outwardly under impetus of springs 36 from the FIG. 1 to the FIG. 2 position, but are still limited in extent by the sleeve.

The body member 32 is provided with a small round rod 38 which is located centrally thereof and extends axially therefrom. This rod has a hole in its extreme end as at 40 and through this hole the pin 16 extends to hold the parts assembled as shown in FIG. 1, but the slot 14 provides for a longitudinal motion of rod 38, body member 32, and the hooks 26. The rod 38 has a cylindrical reduced portion 42 intermediate the ends thereof and this forms a shoulder at 44 which acts as a part of the trigger mechanism to hold the hooks and the body 32 in the FIG. 1 position which also is the same as the FIG. 5 position.

Figure 4:
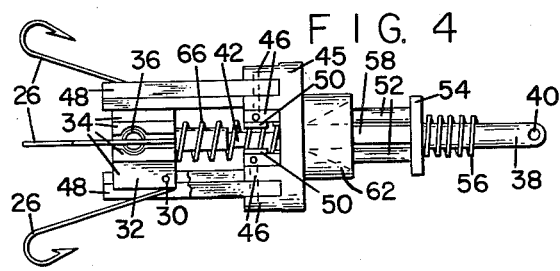
FIG. 4 is a view of the device with the outer members thereof removed for clarity of illustration and showing the device in open or released, fish-hooking position.
Figure 5:
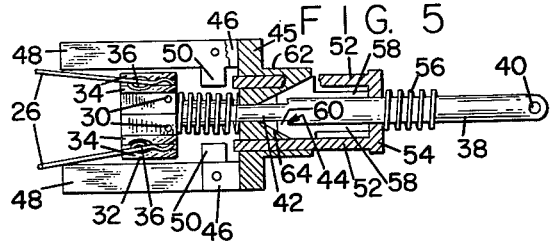
FIG. 5 is a similar view showing the same with the hooks retracted and set in position for casting or trolling.

Slidably mounted on rod 38 is a member 45 which may be in the form of a disc. Mounted on this disc are a series of little posts or other means 46 which pivotally mount longitudinally extending fingers 48, 48. In the illustration of the present case there are four of these fingers and each one has an inturned toe 50 adjacent its pivot. The disc of course has a central aperture through it so that is receivable on rod 38. The disc is provided with a series of holes through which project long pins, in this case four in number, indicated at 52, these being mounted on a disc 54 which is also slidable on rod 38. The pins 52 are slidably received in holes 55 in disc 45, and their free ends are located in the region of the toes 50 by means of a spring 56 which exerts spring tension on the disc 54 in a left-hand direction as seen in FIGS. 4 and 5. Spring 56 bears on head 10 interiorly thereof. Holes 57 provide reception for the ends of posts 46 if these posts should be made separate from the disc.

Figure 6:
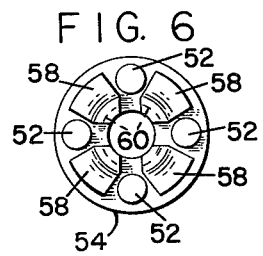
FIGS. 6 and 7 are views on an enlarged scale illustrating parts of the invention.
Figure 7:
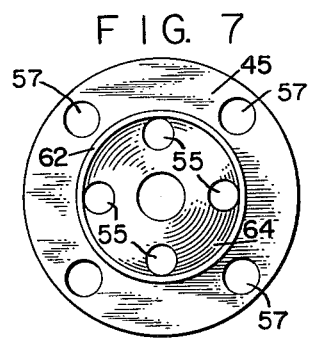

Also mounted on the disc 54 is a spring finger collet having four free-ended parts 58 which extend between the pins 52 (see FIGS. 6) and each part of the collet has an inwardly directed lip 60 at its free end (see FIG. 5) formed by an undercut in the inner aspects of the parts 58 in the collet. The free ends of parts 58 are cam-shaped and generally form a cone.

The disc 45 has a circular thimble 62 extending therefrom oppositely to the pivoted fingers 48 and this is provided with a cam surface in the shape of a cone 64 conforming to the shape of the forward ends of the parts 58 of the collet, which extend inwardly in conical formation as clearly shown in FIG. 5. It will be clear that when the collet is in the FIG. 5 position, the lips at 60 engage the shoulders 44 and are held inwardly in this position by means of the cone 64. It is important to note that when the spring 66 which surrounds rod 38 and finds its reaction points at the bottom of the body 32 and the facing portion of the disc 45, is compressed, this tends to move the body member 32 to the right in FIG. 5, causing the shoulders 44 to grip the lips at 60. However, the normal position of the parts 58 of the collet are such as to be released from shoulders 44, i.e., the internal diameter of the collet is slightly greater than the diameter of rod 38.

Therefore, if the fingers 48 are pivoted inwardlly, the toe portions thereof engage the free ends of the pins 52 and exert pressure to the right, thus moving disc 54 and collet 58 slightly to the right relative to thimble 62. This action releases surface 64 from the inwardly directed exterior surfaces of the parts 58 of the collet which therefore immediately spring outwardly in a radial direction and the rod 38 is released therefrom. The spring 66 continues to move the head 32 to the left, and this motion though slight, is sufficient to allow the hooks to move from the retracted position of FIGS. 1 and 3 to the expanded condition as shown in FIGS. 2 and 4.

On the other hand when the hooks are manually moved radially inwardly from the FIG. 2 position to where they can slide within the rubber or flexible sleeve 24 and then the body member 32 is pushed inwardly to the right, the rod 38 then slides through the member 54 with the conical surface 64 engaging the free ends of the fingers 58 of the collet, and when the shoulders 44 reach the lip 60, they merely snap behind it and the device is triggered.

It will therefore be seen that with the parts in the FIG. 1 position, the lure can be pulled through all kinds of weeds and there are no extending hooks of any kind for the weeds to engage with. There are no slots in member 24 that weeds might possibly get in and the device is completely weedproof.

However when a fish grasps the lure it will distort the sleeve 24 causing the pivoted fingers 48 to move inwardly engaging the free ends of pins 52 to cause release of the hooks by moving the same to the left and the points of the hooks out of engagement with the sleeve 24 as above described.

Figure 8:
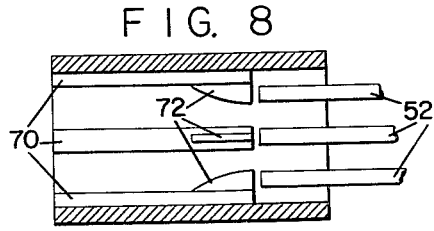
FIG. 8 is a sectional view illustrating a modified skirt.

The construction can be simplified by molding the sleeve of plastic as shown in FIG. 8 and having thereon ridges 70 which are longitudinally positioned with enlargements at 72. The enlargements 72 may be placed in position to be close to the ends of the pins 52 so as to cause the same action as before without the necessity of the pivots for the toe members 50 and the separate fingers 48.

Having thus described my invention and the advantages thereof, I do not wish to be limited to the details herein disclosed, otherwise than as set forth in the claims, but what I claim is:

1. A weedless fishing lure comprising a head, a distortable generally cylindrical skirt mounted on said head, said skirt having an open end, an element axially movable in said skirt, means normally tending to move the element toward the open end of the skirt, a fishhook pivoted on said element and including a bend extending rearwardly toward the open end of the skirt, said bend terminating in a point, means to project said hook radially outwardly relative to said element and to said skirt, means releasably holding said element in a position in the skirt wherein the point of the hook engages the skirt and is held thereby against moving radially outwardly, and means actuated by a distortion of said skirt for releasing said element holding means so that it automatically thereupon moves toward the open end of the skirt, taking the hook with it, to a point where the point of the hook is released from the skirt and projects radially outwardly.

2. A weedless fishing lure comprising a head, means to secure a fiishing line thereto, a distortable generally flexible cylindrical skirt mounted at one end on said head, the other end of the skirt being open, an element mounted for axial motion within said skirt, a rod on said element extending through the skirt and into the head, a fishhook movably mounted on said element within the skirt and having a point extending radially outwardly, means tending to move the hook radially outwardly, said point engaging the interior of the surface of the skirt and being held thereby or alternatively, the element being moved towards the open end of the skirt, the hook projects radially outwardly therefrom, latch means in said skirt, said latch means having interengagement with said rod and temporarily holding the same in an inward position with relation to the open end of the skirt, with the point of the hook in engagement with the interior surface of the skirt so that it is concealed thereby, movable means actuated by distortion of said skirt in an inward direction to release said latch means, and means for projecting said rod and said element in an axial direction toward the open end of the skirt, releasing the hook therefrom.

3. The weedless lure recited in claim 2 wherein said rod includes a reduced portion forming a shoulder and said latch means comprises a collet having engagement with said shoulder, said collet including resilient members which are normally spaced in a radial direction sufficiently to ride on said rod, and means for compressing the collet so as to engage the resilient members thereof with said shoulder.

4. The weedless lure recited in claim 2 wherein said rod has a reduced portion forming a shoulder and said latch means comprises a collet having engagement with said shoulder, said collet including resilient members which are normally spaced in a radial direction sufficiently to ride on said rod, and means for compressing the collet so as to engage the resilient members thereof with said shoulder, the movable means for releasing the collet comprising axially extending pins mounted in fixed relation with respect to the collet and extending toward the rear of the skirt in position to be impinged upon by camming means mounted on the skirt to separate the means for compressing the collet from the collet, allowing the latter to expand and release the rod, said collet member compressing means being repositionable by manual pressure exerted on the element in the skirt in an inward direction thereon.

References Cited by the Examiner
UNITED STATES PATENTS

| | | | |
|---|---|---|---|
| 1,354,952 | 10/1920 | Bullock | 43—35 |
| 1,670,275 | 5/1928 | Willoughby | 43—34 |
| 2,295,042 | 9/1942 | Llewellyn | 43—35 |
| 2,896,355 | 7/1959 | Dean et al. | 43—35 |
| 3,020,667 | 2/1962 | Lamar | 43—35 |

SAMUEL KOREN, *Primary Examiner.*